April 14, 1964 K. C. JONES 3,128,678
CONTROL APPARATUS
Filed July 11, 1962

INVENTOR.
KEITH C. JONES
BY *[signature]*
ATTORNEY

United States Patent Office 3,128,678
Patented Apr. 14, 1964

3,128,678
CONTROL APPARATUS
Keith C. Jones, Minneapolis, Minn., assignor to Minneapolis-Honeywell Regulator Company, Minneapolis, Minn., a corporation of Delaware
Filed July 11, 1962, Ser. No. 209,199
7 Claims. (Cl. 91—413)

This invention relates to improvements in control apparatus for moving craft, such control apparatus being generally of the type disclosed in the prior application of Robert J. Kutzler, Serial No. 843,506, filed September 30, 1959, now Patent No. 3,051,137. The present apparatus resembles the prior Kutzler apparatus in utilizing a pair of linearly operable pneumatic type servomotors for operating a control surface of a moving craft such as an aircraft as shown in FIGURE 2 of the Kutzler application. The present apparatus differs from the Kutzler apparatus in the type of control valve used to control each linear actuator. Each linear actuator herein utilizes a three-way valve for controlling operation of the actuator rather than utilizing an exhaust valve and an intake valve operable as in the Kutzler application.

Each valve herein is biased to a normal position wherein the actuator is in communication with the atmosphere for exhaust purpose. Electrical operable means such as a solenoid is utilized to operate the valve thus to place the linear actuator in communication with a source of pressure and to simultaneously close its communication with atmospheric pressure. The electrical operable means herein for the valves of the two servomotors or actuators may correspond with windings 43, 44, FIGURE 1 of a prior application of Daniel J. Sikorra, Serial No. 113,885, filed May 31, 1961, thus so much of the above arrangement is old. Heretofore during the operation of the above arrangement, utilizing the Sikorra type of "blocking oscillator" for operating the two three-way valves, difficulty was encountered in operating the valves when higher than the usual air pressure were being applied from the source. This failure was thought due to the fact that the pressure from the source as connected tended to close the three-way valve thereby opposing action of the solenoids and shutting off the linear actuator from the supply pressure.

It is therefore an object of this invention to provide an improved actuating means for the control valves of two linear actuators.

It is a further object of this invention to improve the operating means of each control valve of two linear actuators wherein the opening of one valve of two actuators is assisted by the closing of the valve of the other actuator.

It is a further object of this invention to provide an improved valve actuating means for a pair of linear pneumatic type servomotors wherein the change in air pressure for operating each linear actuator has substantially no effect upon the operation of the control valves.

The above and other objects and advantages of the invention will become evident upon consideration of the following description taken in conjunction with the accompanying drawings disclosing one embodiment thereof.

Referring to the drawing.

Figure 1:
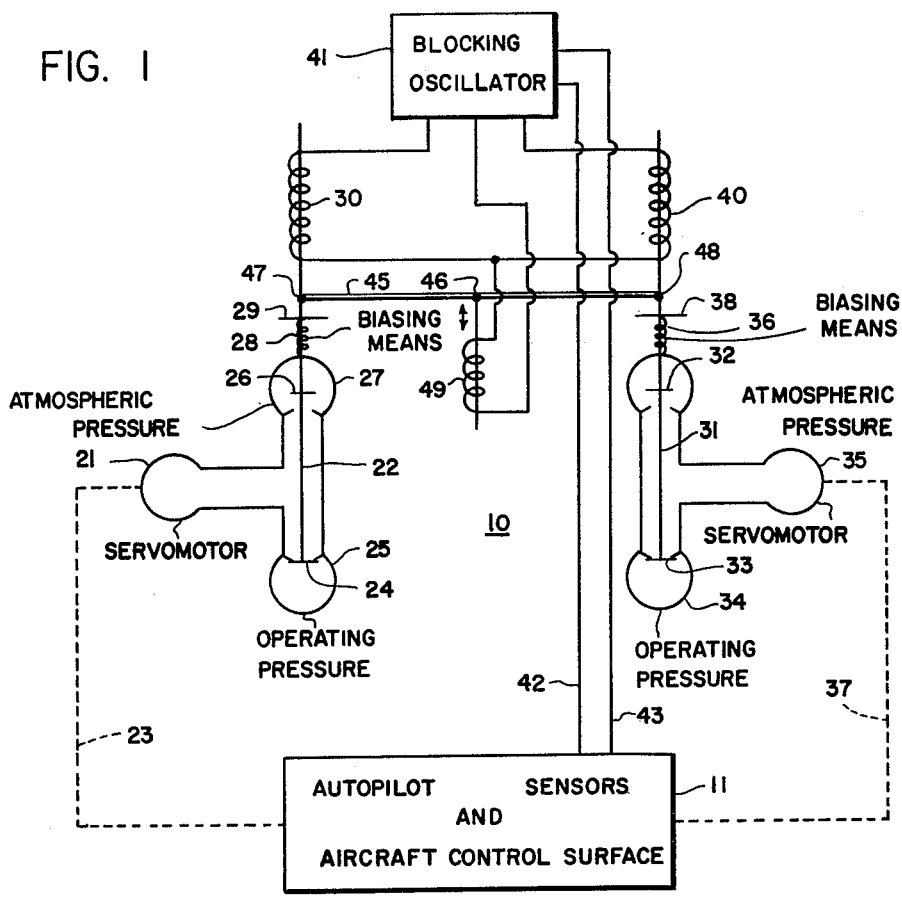
FIGURE 1 is a schematic representation of the improvement in valve operating means.

Referring to the drawing, control apparatus 10 for controlling an aircraft in flight comprises in block form a section 11 comprising the autopilot sensors such as conventional attitude gyroscopes, rate gyroscopes, etc. along with an aircraft control surface such as a rudder surface of the craft and its mechanical operating means. The mechanical means of the rudder surface is operated jointly by two linear operable pneumatic servomotors 21, 35 forming a dual section pneumatic servomotor as more fully illustrated in the aforesaid application of Robert J. Kutzler, Serial No. 843,506, now Patent No. 3,051,137. Such operation is effected by servo operating linkages 23, 37 extending from the output side of the actuators, 21, 35. Servomotor 21 is controlled by a poppet valve 22 of the three-way type having one valve portion 26 normally open to the atmosphere and a second valve portion 24 normally in a closed position. When operated, the portion 24 leaves its valve seat and permits operating pressure from pressure source section 25 to be applied to the cylinder of linear servo actuator 21. The valve 22 is urged upwardly in the figure to a closed position by a spring means 28 intermediate atmospheric chamber 27 and a collar 29 on an extension of valve 22. The valve 22 is moved to open position upon energization of an electrical operable means 30 which may be a solenoid.

The other servomotor 35 is controlled by poppet valve 31 having a valve portion 32 normally disengaged from its valve seat and in open position and communicating with atmospheric pressure and a second valve portion 33 normally engaging a seat and thus in closed position. When the valve 31 is moved to a lower position from that shown in the figure, valve portion 33 disengages its valve seat and communicates an operating pressure in chamber 34 to the linear actuator 35. Meanwhile the valve portion 32 engages its valve seat to close off motor 35 with the atmosphere. Valve 31 is biased to closed position shown in the figure by a biasing means such as a spring 36 intermediate atmospheric pressure chamber 37 and a collar 38 fixed to an extension of valve 31. Valve 31 is moved downwardly from the position shown in the figure by energization of an electrical operable means 40 upon energization thereof.

The two electrical operable means 30, 40 correspond with the windings 43, 44, FIGURE 1, of the aforesaid Sikorra application, Serial No. 113,885. Input control signals to the blocking oscillator 41 are supplied over conductors 42, 43 from the autopilot sensors so that conductors 42, 43 herein correspond with similar conductors 46, 47 of FIGURE 1 of the aforesaid Sikorra application.

As thus far described, the arrangement is old and the improvement herein consists in the features to be now described. As stated above, when higher air pressures were applied to chambers 25, 34 they acted against the valve portions 24, 33 in opposition to the force due to energization of windings 30, 40. At times, such operating pressures were so much in excess of the normal operating pressure, that the windings 30, 40 could not remove valve portions 24, 33 from their valve seats to permit passage of air to effect operation of linear actuators 21, 22.

While it may appear that increasing the magnetomotive force or other magnetic properties of windings 30, 40 could result in a greater force being applied to valves 22, 31. This type alteration or change would alter the output electrical impedance on the blocking oscillator 41. It is desirable to retain such original output impedance unchanged and to provide compensation for increased valve load, due to increasing pressures, in another manner. Such valve load compensation is achieved by providing a lever 45 supported on a movable pivot 46 central of the lever. Pivot 46 is provided with suitable mounting means and is movable in the direction of operation of valves 22, 31. The opposite ends of the lever 45 are connected at suitable joints 47, 48 to the extensions of valves 22, 31 respectively. A third winding 49 associated with suitable means for operating the pivot 46, is placed in series with each present or substituted winding 30, 40 so as to be jointly energized with either winding 30, 40. The electrical impedance of present windings 30, and 49 together, and also the electrical impedance of present windings 40 and 49 together, correspond with the impedance in windings 30 and 40 separately but originally provided. In other words, original windings 30 and 40 have been modified.

The mounting means 46 for lever 45 is such that if winding 30 be considered as being energized, the joint formed by the right end of lever 45 at 48 may be considered as a fulcrum since the pressure in chamber 33, along with the biasing means 36, holds valve 31 in the upper position. The energization of winding 30 directly opposes the biasing means 28 and the source pressure against valve portion 24. The energization of winding 49 through its moment cam between pivot 46 and connection 48 assists in the opening of valve 26.

It will be understood that windings 30 and 49 act in the same direction as is equally true of windings 40, 49. If either windings 30 or 40 be energized along with winding 49, the pivot 46 is moved to its fully operated position, and remains there due to the alternate pulsing of windings 30, 40. The pulsing action is considered in FIGURE 2 and is more fully disclosed in the aforesaid Sikorra application.

If winding 40 be energized with a wider pulse width and thus for a greater time than that applied to winding 30 with valve portion 26 as yet in open position, it will be evident that the source pressure applied on closed valve portion 24 along with the greater time energization of winding 40 over winding 30 along with the energization of winding 49 will assist in the opening of valve 31. By thus utilizing the operating pressure in chamber 25 in the particular example to assist in opening the valve portion 33 against the operating pressure in chamber 34 and in view of the fact that the pressures in the two operating chambers 25 and 34 are the same, it is clear that the operation of valves 22, 31 is independent of increases in source operating pressures. It will be evident that if windings 30, 40 on a basis of time alternately be equally energized that the pivot 46 is operated with the first energized of windings 30, 40 and is held thereafter to a lower position. Windings 30 and 40 as stated are alternately energized, and with no control signal on conductors 42, 43 to oscillator 41 windings 30 and 40 are equally energized. Therefore, if winding 30 be energized firstly, the simultaneous energization of winding 49 causes movement of pivot 46 downwardly and opening of valve portion 24, but valve portion 33 remains closed. When winding 40 is energized, however, valve 31 is opened and valve 22 is closed. These valves, 22, 31 thus are alternately pulsed at around 20 cycles per second with the net effect at 20 cycles per second being of a sufficiently high repetition rate so that with no control signal on conductors 42, 43 the net effect is no relative operation of servomotors 21, 22 from their normal positions.

While the working oscillator 41 may take the configuration of FIGURE 1 of the Sikorra application, it may also take the configuration of FIGURE 4 with the resistors 61, 64 being replaced by the windings 30 and 40 herein.

Figure 2:
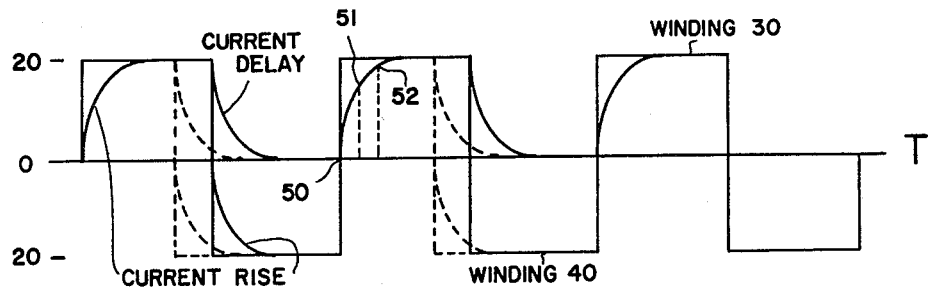
FIGURE 2 is a diagram pertaining to operation of a valve actuator.

FIGURE 2 shows in solid lines the normal output of the blocking oscillator when no control signal is applied to its input terminals. One-half square wave is applied to winding 30, the other half wave to winding 40. It will be evident from FIGURE 2 that the solenoid windings are alternately energized for equal periods of time and equal amplitudes of electrical voltage. While the wave form is shown in alternate half-cycles, it is to be understood that the maximum values are positive voltages irrespective of the fact that half of the wave is shown below the zero magnitude ordinate. At point 50 in FIGURE 2, the initial energization of one winding occurs. The current through the winding because of self inductance of the winding, does not increase linearly with time, but the valve operates when the magnitude of the current attains that shown say—at 51. This may be considered the operating point of the valve, and the time interval between points 50 and 51 on the time scale represents the time delay of the valve operating. Similarly, the other valve operating winding has a similar current curve and time delay for its pull-in point.

FIGURE 2 also shows by the dashed line the effect of a control signal on conductors 42, 43 on the shape of the wave. It will be noted that the first half-cycle is now much narrower in width than normal, whereas the second half cycle of the opposite winding energization wave has a greater width indicating that it is energized a longer period than the first winding. Because of the difference in relative operating times duration of the two valves, there will be a resultant operation of the control surface of the craft.

More directly involved, however, at this point is the consideration of a time delay in valve operation involving alteration of the original windings 30, 40 to compensate for higher servo operating pressures from the pressure source. As stated, it was desired to retain the electrical output impedance constant of the blocking oscillator 41. If we merely increase the ampere turns of one valve operating winding to increase the magnetomotive force to compensate for increased operating pressures, we increase the inductance and we may consequently double the time delay of the valve so that it would open at the interval of point 52, FIGURE 2. It will be appreciated by reference to FIGURE 2 that by increasing the magnetomotive force by increasing turns, the time in which one valve is opened has now been substantially increased if the time delay be the interval between 50—52 rather than the interval between 50—51. Carrying the thought further, it is evident that if further modulation or narrowing of half of the wave were to occur by signals on conductors 42, 43, the vertical dashed line, indicating when energization of the first winding terminals, might actually pass through the point 52 thereby indicating that the valve concerned did not operate at all in this half-cycle, thus destroying modulated control of the operation of the two actuators in accordance with the magnitude of control signal on oscillator 41.

In view of the desirability of retaining the original time delay for a valve discussed in the above, the subject arrangement was resorted to utilizing the pivoted lever 45. The result of the arrangement using paired windings 30, 49 or 40, 49 for constant oscillator output impedance has been that the time constant or time delay of each valve or solenoid winding that operates a control valve is substantially the time interval 50—51. It will be further evident after valve cycling is initiated that if valve portion 24 be open, portion 33 will be closing thereby assisting the opening of portion 24 and thus making its operation independent of pressure changes. While FIGURE 1 has illustrated the control valves 23, 31 as having thin stems, actually in practice the valve stems are of considerable cross-sectional area so that but a small annular portion is formed between the stem exterior and the valve portion periphery when the valve is closed. Consequently, there is very little area of the valve portion which is adjacent the valve seat that receives the same operating pressure as that applied to the head of the valve portion in the pressure source chamber. Therefore the practical forces acting along the valve direction of operation are those from winding 30, spring 28, connection 47 and valve portion 24 exterior of its valve seat, with respect to valve 23. Similar forces are applied to valve 31 in any force analysis of these valves.

What is claimed is:

1. In a dual section pneumatic servomotor each section having a three way valve biased to a normally open position to vent each servomotor section to atmosphere and operable to another position for applying pressure to said servomotor section, a source of control signal;
   operating means for each valve;
   a source of pulse width modulated energy responsive to said control signal for energizing the operating means of said valves alternately, a lever mounted on a movable pivot intermediate connections from said lever to each valve;

and means shifting said pivot jointly energized concurrently with the energization of a valve operating means.

2. In a dual section pneumatic servomotor for positioning a member, each section operating in opposition to the other section so that normally there is no change in position of said member, valve means controlling the admission of differential pressure to said two sections to effect operations of said member, said valve means comprising a solenoid operated valve for each section, a movable pivot lever having one end connected to one valve and the remaining end connected to the other valve, solenoid means adjusting said pivot and electrically in series with the operating solenoid of each valve.

3. A dual section fluid type servomotor, each section having a poppet valve displaceable from a normal position to effect operation of said section;

a lever supported on a movable pivot at a point intermediate its ends and having one end connected to one valve and the remaining end connected to the other valve;

an operating means for each valve;

an operating means for said pivot, the direction of operation of said pivot being in the direction of operation of either valve;

and means jointly energizing the pivot operating means and either valve operating means.

4. The apparatus of claim 3 wherein the operating means for each valve comprises means of applying a pulse of modulated electrical signal to said valves to provide a time difference in operation period of one valve relative to the other.

5. A dual section fluid type servomotor, each section having a poppet valve displaceable from a normal position to effect operation of said section, each valve being biased to a normal position;

a lever supported on a movable pivot at a point intermediate its ends and having one end connected to one valve and the remaining end connected to the other valve;

and operating means for each valve opposing the biasing means and that of the motor operating pressure source; an operating means for said pivot, the direction of operation of said pivot being in the direction of operation of either valve;

and means jointly energizing the pivot operating means and either valve operating means, the unoperated valve meanwhile acting as a fulcrum for said lever.

6. In a fluid type linear operable servomotor having a poppet valve for control thereof;

means biasing said valve to unoperated position to vent the servomotor to atmospheric pressure;

electrical operated means opening said valve against said biasing means and against the source of servo operating pressure means;

a lever having a movable pivot intermediate its ends and having one end connected to said valve and the other end serving as a fulcrum;

electrical operating means moving said pivot;

and means jointly energizing both electrical operated means, whereby operation of said lever pivot operating means assists in opening said valve.

7. The apparatus of claim 6, wherein said fulcrum comprises a poppet valve of a second similarly arranged linear operable servomotor having its electrical operated means alternately energized with the electrical operated means for the first said valve.

References Cited in the file of this patent
UNITED STATES PATENTS
2,423,935    Hart _____ July 15, 1947